June 26, 1951
M. C. YEASTING
2,558,164
PIVOTAL MOUNTING
Filed May 13, 1946
4 Sheets-Sheet 1
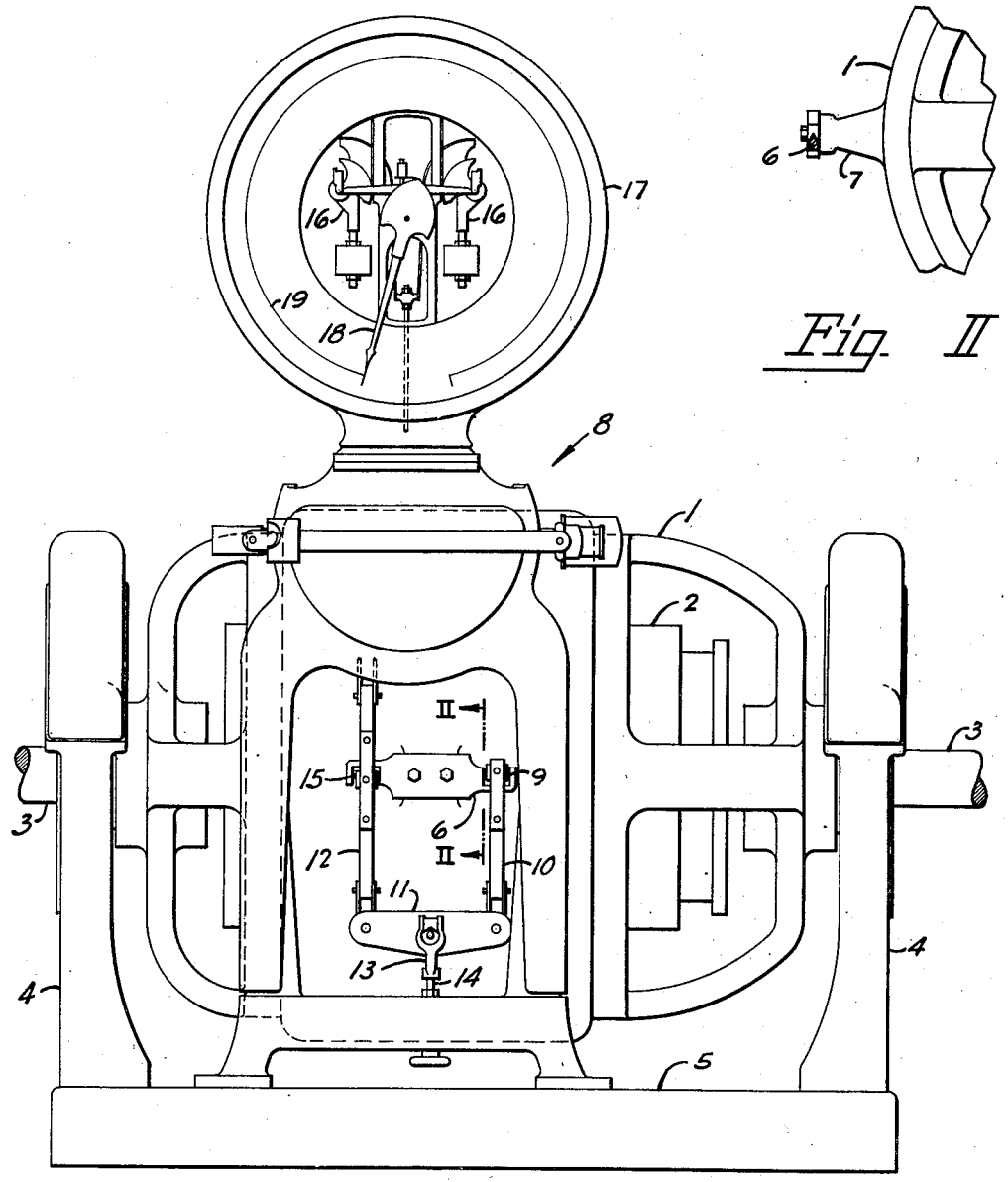
Fig. II
Fig. I
INVENTOR.
Maynard C. Yeasting
BY
Marshall and Marshall
ATTORNEYS June 26, 1951 M. C. YEASTING 2,558,164
PIVOTAL MOUNTING
Filed May 13, 1946 4 Sheets-Sheet 2
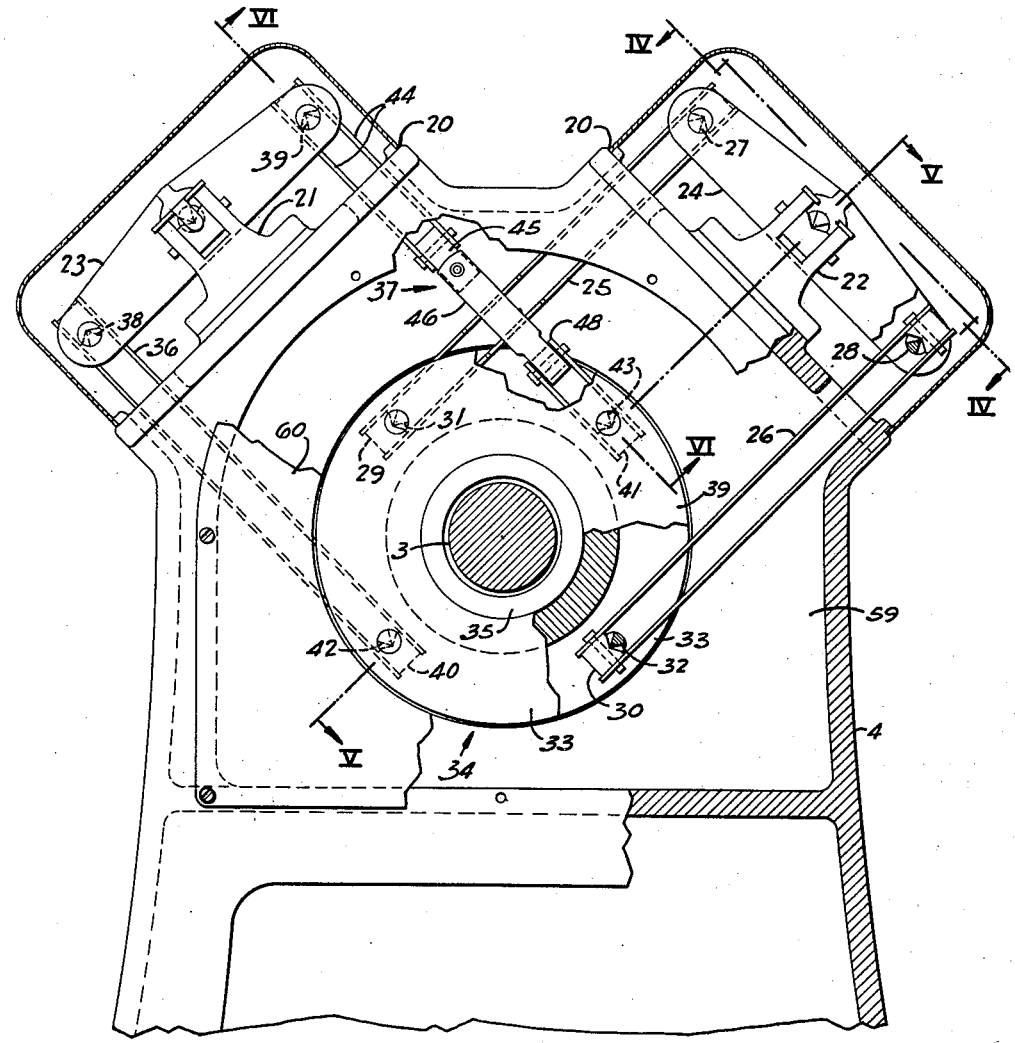
Fig. III
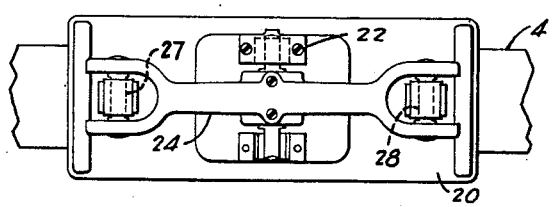
Fig. IV
INVENTOR.
Maynard C. Yeasting
BY
Marshall and Marshall
ATTORNEYS June 26, 1951 M. C. YEASTING 2,558,164
PIVOTAL MOUNTING
Filed May 13, 1946 4 Sheets-Sheet 3
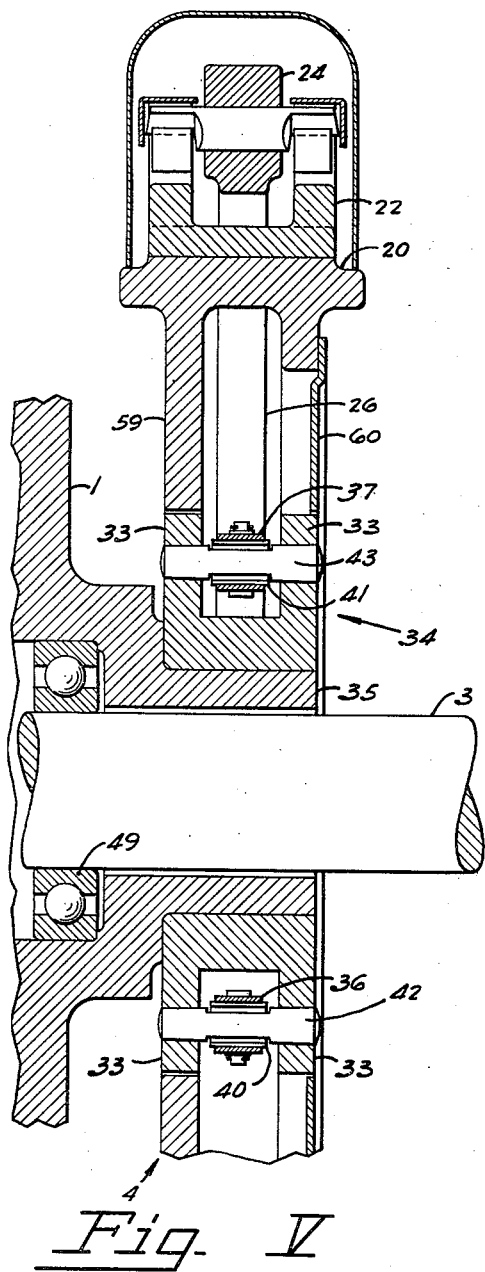
_Fig. V_
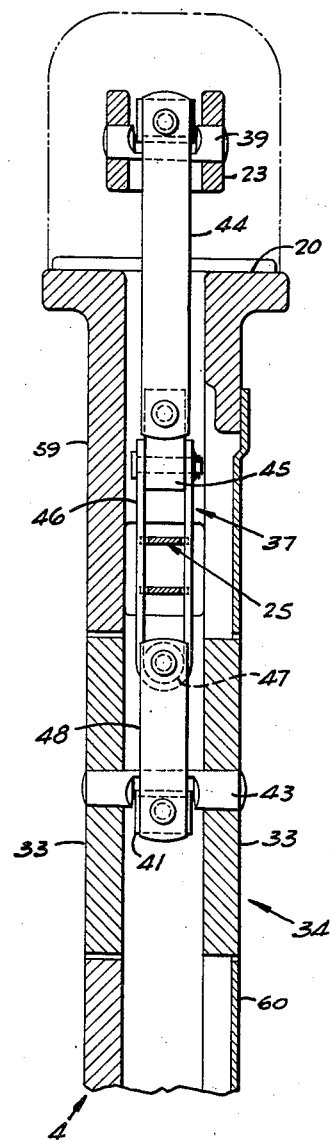
_Fig. VI_
INVENTOR.
Maynard C. Yeasting
BY
Marshall and Marshall
ATTORNEYS June 26, 1951 M. C. YEASTING 2,558,164
PIVOTAL MOUNTING
Filed May 13, 1946 4 Sheets-Sheet 4
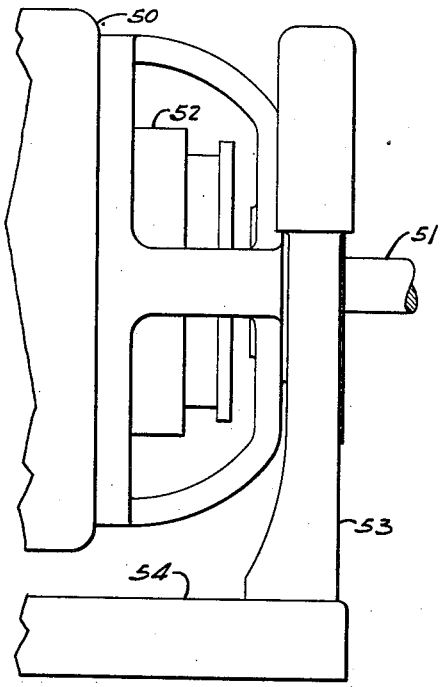
_Fig. VII_
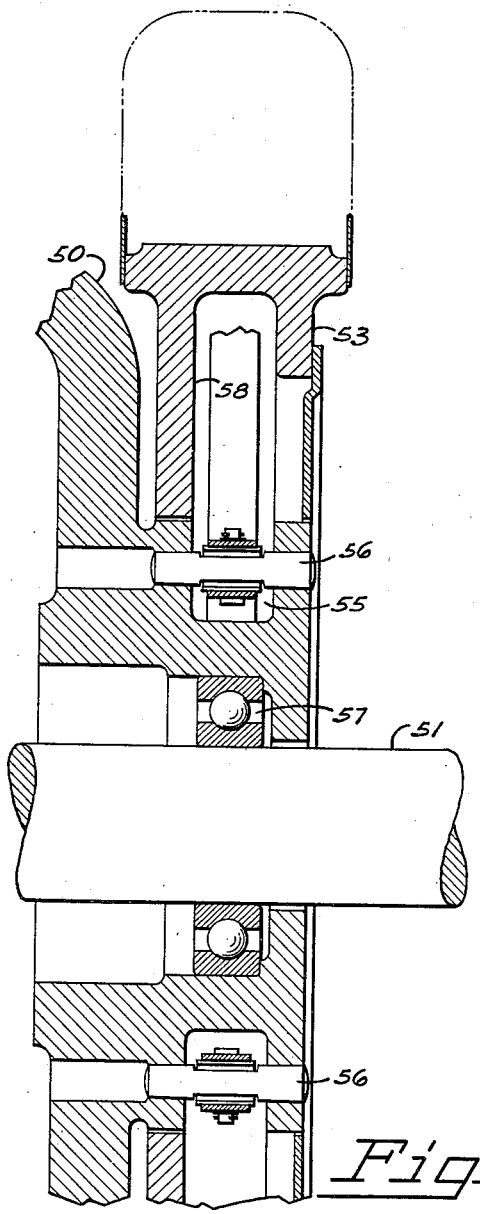
_Fig. VIII_
INVENTOR.
Maynard C. Yeasting
BY
Marshall and Marshall
ATTORNEYS Patented June 26, 1951

2,558,164

UNITED STATES PATENT OFFICE 2,558,164

PIVOTAL MOUNTING

Maynard C. Yeasting, Toledo, Ohio, assignor to Toledo Scale Company, Toledo, Ohio, a corporation of New Jersey Application May 13, 1946, Serial No. 669,443

4 Claims. (Cl. 248—17)

This invention relates to pivotal mountings and in particular to a pivotal mounting which is characterized by extremely low friction and which leaves the space around and including the pivoting axis free for a rotating shaft or other apparatus not pertaining to the pivotal mounting.

The power output of power producing or transmitting devices and a power input requirements of driven apparatus are usually measured by means of a dynamometer. A dynamometer is a power producing or absorbing device whose stator is free to rotate about the same axis as its rotor, but which rotation is restricted by a force measuring device, for example, a weighing scale. The accuracy of the torque measurement of a dynamometer depends upon the friction in the mounting for the stator of a dynamometer. If this friction is zero all of the input or output torque of the dynamometer is weighed by the weighing scale. If there is friction in the mounting the indication of the weighing scale will be greater or less than the true value of the torque by the amount of torque required to overcome the friction.

Because the rotor shaft must extend along the pivoting axis of the frame or stator of the dynamometer it is impossible to employ a knife edge as the pivoting support for the dynamometer frame. For this reason ball bearings mounted on trunnions through which the rotor shaft extends are usually employed to support the stator of a dynamometer. Even the best of ball bearings introduce some friction and prevent absolutely free rotation of the stator of a dynamometer. The static friction of the bearings has, in special instances, been reduced by providing auxiliary equipment to continuously rotate or oscillate the outer races of the ball bearings. These devices are generally cumbersome and must be very carefully and accurately installed or they introduce errors as large or larger than the friction errors that they are designed to eliminate.

The principal object of this invention is to provide a pivotal mounting having extremely low friction and which does not obstruct the pivoting axis of the supported member.

Another object of the invention is to provide a pair of pivotal supporting systems disposed in angular relation to each other to define a pivoting axis.

A still further object is to provide a suspension system for a dynamometer in which the supported member is suspended from a pair of levers which are free to rotate to accommodate rotation of the supported member.

These and other objects and advantages are attained in the improved pivotal mounting, an example of which is shown in the accompanying drawings.

According to the invention each end of the member to be pivotally supported is pivotally connected to each of a pair of levers which in turn are pivotally mounted on a supporting frame. The levers are arranged at substantial angles to each other so that each lever with its connections defines an arc about which the supported member may swing and the arcs defined by the respective levers intersect at a single point which defines the axis of rotation of a supported member. While flexure plates may be employed as pivotal connections, the preferred form of pivotal connection is a knife edge resting in the rounded bottom of a V-groove bearing. This type of pivotal connection is employed in an example of the improved pivotal mounting illustrated in the accompanying drawings.

In the drawings:

Figure I is a front elevation of a dynamometer and associated weighing scale.

Figure II is a fragmentary detail taken along the line II—II of Figure I showing the connection from the torque arm of the dynamometer to the weighing scale.

Figure III is a fragmentary end elevation, partly in section and with parts broken away, showing the improved pivotal mounting.

Figure IV is a plan view of one of the suspension levers as seen from the line IV—IV of Figure III.

Figure V is a sectional view of the improved mounting as seen from the line V—V of Figure III.

Figure VI is a sectional view taken along the line VI—VI of Figure III.

Figure VII is a fragmentary front elevation of a modified form of the invention.

Figure VIII is a vertical section of the modified form of the invention.

These specific figures and the accompanying description are intended merely to illustrate the invention but not to impose limitations on the claims.

A dynamometer supported according to the invention comprises a stator 1 and an armature or rotor 2 mounted on a shaft 3 that is rotatably journaled on bearings mounted in the end frames of the stator 1. The stator 1 is pivotally supported from pedestals or frames 4 erected from a base 5 so as to be freely oscillatable about the center line of the shaft 3. Forces generated between the stator 1 and the rotor 2 of a dynamometer which either tend to turn or to resist turning of the shaft 3 produce forces tending to rotate the stator 1 in the opposite or same direction as the shaft 3. In a perfect dynamometer these stator turning forces are resisted solely by forces transmitted through a knife edge bar 6 mounted on a torque arm 7 extending laterally from the stator 1 of the dynamometer and connected to a weighing scale 8. If the forces are in a direction such that the knife edge bar 6 tends to rise, the force is transmitted through an upwardly directed knife edge 9, a depending linkage 10, an even-armed lever 11, and a linkage 12 suspended from the lever mechanism of the scale 8. Upward movement of the lever 11 is prevented by a stirrup 13 suspended from its fulcrum knife edges which stirrup is held by a bolt 14 threaded through the base of the scale 8.

If the turning forces generated between the stator 1 and the rotor 2 tend to turn the stator so that the knife edge bar 6 moves downwardly the force is transmitted directly from a downwardly directed knife edge 15 through the linkage 12 to the lever mechanism of the scale 8. The forces from the dynamometer after passing through the lever system of the scale 8 are counterbalanced by a pair of pendulums 16 mounted in a dial housing 17 and operatively connected to an indicator 18 which sweeps over a chart 19 to indicate the magnitude of the forces developed by the dynameter.

In any dynamometer the weighing scale which indicates the torque delivered or received by the dynamometer can only indicate the force applied to the knife edge bar 6. This force may be greater or less than the torque delivered or received by the shaft 3 according to the magnitude of any other forces which tend to cause or restrict rotation of the stator frame 1. These forces are introduced by the mechanism used to support the stator 1. According to the invention the forces introduced by the mounting which tend to restrict rotation of the stator 1 are minimized by employing knife edges and bearings. The preferred arrangement of the parts of the suspension is illustrated in Figure III. Each of the pedestals 4 is a generally hollow frame having a pair of inclined faces 20 on which fulcrum stands 21 and 22 are mounted. The center lines of the fulcrum stands are located on lines extending upwardly at an angle of 45 degrees from the shaft 3. Even armed levers 23 and 24 are pivotally mounted in the fulcrum stands 21 and 22 with their fulcrum knife edges parallel to the axis of the rotor shaft 3. Linkages 25 and 26 depending from terminal knife edges 27 and 28 of the lever 24 carry V-bearings 29 and 30 which engage knife edges 31 and 32 mounted between flanges 33 of a flanged ring 34 that is fitted over a trunnion 35 extending axially from the stator 1. Another set of linkages 36 and 37 suspended from terminal knife edges 38 and 39 of the lever 23 carry bearings 40 and 41 that engage knife edges 42 and 43 mounted in the flanged ring 34. The edges of the knife edges 31 and 32 are symmetrically located along one diameter of the ring 34 while the edges of the knife edges 42 and 43 are symmetrically located along a second diameter of the flanged ring 34 which second diameter is substantially perpendicular to the first. The lengths of the arms—the distance from the fulcrum to the terminal knife edges—of the levers 23 and 24 are equal to the radial distances of the knife edges 42, 43 and 31, 32 respectively as measured from the axis of the shaft 3. Thus, the linkages 25 and 26 are parallel to each other and the linkages 36 and 37 are also parallel to each other. This system permits free rotation of the stator 1 because each system of lever, linkage and knife edges in the ring 34 taken separately provides a virtual turning center midway between its knife edges in the ring 34. Translation of the supported member is prevented because each lever and its associated links limits the translation of the center of the shaft 3 to an arc whose radius is equal to the distance of the shaft center from the fulcrum of the lever, and because each system prevents movement along the arc permitted by the other system. The weight of the supported member is great enough to prevent any upward motion.

Referring to Figure V the flange 33 nearest the stator 1 is radially aligned with a rear wall 59 of the pedestal 4. The radial clearance between the flange 33 and the hole in the wall 59 is great enough so that no contact occurs between the parts and is small enough to prevent the ingress of foreign material or objects which might lodge between the linkages and the ring 34 and thereby cause binding of the linkages which would interfere with the free rotation of the stator 1. The open front side of the frame 4 is closed by a cover 60 to similarly protect the linkages. Likewise, formed sheet metal housings are included to cover the levers 23 and 24.

The linkage 37 differs in construction from the others because it must pass the linkage 25 without interfering with the latter linkage. A construction to provide this clearance is illustrated in Figures III and VI. Referring to Figure VI the linkage 37 comprises a pair of straps 44 depending from the bearing resting on the knife edge 39 and pinned to a turning block 45. A U-shaped stirrup 46 pinned to the turning block 45 carries at its lower end a cylindrical spacer 47 which is located between a pair of straps 48 that are pinned to the bearing 41 resting against the knife edge 43. The straps forming the sides of the linkage 25 are reduced in width where they pass between the sides of the U-shaped stirrup 46 so that they are entirely free from contact with the stirrup.

The stator 1, in the improved mounting, hangs suspended from the two levers and associated linkages located in the pedestals 4 at each end of the stator. It is free to move axially being in effect suspended from vertical links whose length is seven tenths that of the linkages 25 or 37. Most devices to be tested by dynamometers are constructed so that they provide against any axial motion of their input or output shafts. Therefore, if the dynamometer is connected to such a device when the plane of the links is vertical, there will be no tendency for the dynamometer to move endwise. This type of mounting in respect to axial motion has the advantage that it substantially removes all end thrust from bearings 49 journaling the shaft 3 in the stator 1. If it is necessary that the dynamometer be restricted against endwise motion, suitable check links may be provided.

The example of the invention described and illustrated in Figures III, IV, V and VI may be used to replace an ordinary ball bearing dynamometer mounting because the flanged ring 34 fits on the trunnion 35 in exactly the same manner as the inner race of the conventional ball bearing fits the trunnion.

One disadvantage of the ordinary dynamometer which could not be eliminated when a conventional ball bearing suspension is used, is the long overhang of the shaft 3 beyond the bearings 49 that journal it in the stator 1. This overhang was accepted as preferable to the increased friction which resulted if the stator supporting ball bearings were made large enough to fit radially outside of a trunnion that enclosed the shaft bearing. The improved mounting it not limited in this way because its freedom from friction is independent of the length of the arms of the levers 23 and 24. The angular motion of the knife edges on the bearings is the same as the angular movement of the stator regardless of the lever arm lengths. Therefore, it is possible without sacrifice of performance to materially decrease the length of the dynamometer and particularly the length of the overhang of the shaft 3 by locating the suspensions in the plane of the shaft bearing.

A dynamometer constructed to take advantage of this aspect of the invention is illustrated in Figures VII and VIII. In these figures a stator 50 in which a shaft 51 carrying an armature 52 is journaled, is supported on pedestals 53 erected from a base 54. Referring to Figure VIII, the end frame of the stator 50 is provided with an annular groove 55 in whose side walls knife edges 56 are mounted. The groove 55 lies radially outside a bearing 57 in which the rotor shaft 51 is journaled. As in the preceding example, the stator is carried by levers and linkages connected to the knife edges 56. A wall 58, that wall of the pedestal 53 positioned adjacent the stator 50, has an opening just sufficient to clear the juxtaposed inner edge of the groove 55. This wall serves as a safety check against lateral translation of the stator 50 and also by its axial proximity to the end frame of the stator 50 serves to restrict axial motion of the stator.

The improved mounting materially reduces the frictional forces tending to restrict the free rotation of the stator of a dynamometer because the frictional force is reduced to that of ten knife edges resting on bearings for each end of the dynamometer. These ten knife edges and bearings replace twenty or more balls of the conventional ball bearing support. The angular motion between the knife edge and the bearing is considerably less than the annular motion of a ball in a ball bearing for the same amount of rotation of the stator. Thus a gain is made in reducing the friction both by reducing the angular movement between the parts and also by reducing the areas that are in contact.

Various modifications of the described structure may be made as are required to adapt the improved mounting for use with various types of equipment.

Having described the invention, I claim:

1. In a device of the class described, in combination, a supporting frame, a body to be pivotally supported, a plurality of levers pivotally mounted on the frame, knife edges mounted in the body to be supported, and linkages pivotally engaging the levers and the knife edges of the body for supporting the body from the levers.

2. In a device of the class described, in combination, a supporting frame, a body to be pivotally supported, a pair of levers pivotally mounted on the frame, each of the levers having a pair of knife edges, the levers being generally perpendicular to each other, knife edges mounted on the body, there being a pair of knife edges in the body for each of the pair of levers, and linkage connecting the knife edges of the body to the knife edges of the levers for supporting the body.

3. In a device of the class described, in combination, a supporting frame, a body to be pivotally supported, a pair of levers pivotally mounted on the frame, the levers being generally perpendicular to each other and inclined generally equal amounts each side of the vertical, knife edges mounted on the body, the knife edges being symmetrically spaced with respect to the axis about which the body is to pivot along lines parallel to the levers, and linkage connecting the knife edges to the levers.

4. A supporting assembly that permits the supported body to be rotated through small angles comprising at least two rockable elements each of which is rockable about an axis parallel to and displaced from the axis of the body and sets of linkage connecting the body to the rockable elements, each set of linkage being divided into parts, each part having an effective length equal to the distance between the axis of the body and the axis of the rockable element and extending along a line parallel to and displaced from a line passing through the axis of the body and the axis of the rockable element to which that set of linkage is attached.

MAYNARD C. YEASTING.

REFERENCES CITED

The following references are of record in the file of this patent:

UNITED STATES PATENTS

| Number | Name | Date |
| --- | --- | --- |
| 1,514,607 | Ellis | Nov. 11, 1924 |
| 1,617,279 | Tower | Feb. 8, 1927 |
| 2,062,128 | Hamerstadt | Nov. 24, 1936 |